United States Patent
Kwon

(10) Patent No.: US 9,036,313 B2
(45) Date of Patent: May 19, 2015

(54) APPARATUS FOR PROTECTING ANALOG INPUT MODULE FROM OVERVOLTAGE

(75) Inventor: Jae Il Kwon, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 764 days.

(21) Appl. No.: 13/178,341

(22) Filed: Jul. 7, 2011

(65) Prior Publication Data

US 2012/0013385 A1    Jan. 19, 2012

(30) Foreign Application Priority Data

Jul. 16, 2010    (KR) .................. 10-2010-0068893

(51) Int. Cl.
*H03K 5/08*    (2006.01)
*G05B 9/02*    (2006.01)

(52) U.S. Cl.
CPC ........................................ *G05B 9/02* (2013.01)

(58) Field of Classification Search
CPC   H03G 11/02; H01L 27/0255; H01L 27/0251; G05B 9/02
USPC .................................... 361/91, 91.1; 327/325
See application file for complete search history.

(56) References Cited

U.S. PATENT DOCUMENTS

| 2009/0198399 A1* | 8/2009 | Kubo et al. ................ 701/22 |
| 2011/0069419 A1* | 3/2011 | Su et al. ..................... 361/56 |

FOREIGN PATENT DOCUMENTS

| JP | 04-159802 | 6/1992 |
| JP | 8-149681 | 6/1996 |
| JP | 10-197588 | 7/1998 |
| JP | 2006-340253 | 12/2006 |
| KR | 1020080102999 | 11/2008 |
| KR | 1020090085924 | 8/2009 |

OTHER PUBLICATIONS

State Intellectual Property Office of the People's Republic of China Application Serial No. 201110206306.9, Office Action dated Sep. 17, 2013, 6 pages.

* cited by examiner

*Primary Examiner* — Jared Fureman
*Assistant Examiner* — Nicholas Ieva
(74) *Attorney, Agent, or Firm* — Lee, Hong, Degerman, Kang & Waimey

(57) ABSTRACT

Disclosed is an apparatus for protecting an analog input module from overvoltage, the apparatus including an analog input module and a stabilization unit. The analog input module converts one of a plurality of positive/negative analog signals inputted from the outside thereof into a digital signal and insulates the converted digital signal. The stabilization unit supplies voltages of the positive/negative analog signals to the analog input module when the voltage levels of the plurality of positive/negative analog signals are higher than the levels of positive/negative operating voltages in the analog input module.

6 Claims, 2 Drawing Sheets

“APPARATUS FOR PROTECTING ANALOG
INPUT MODULE FROM OVERVOLTAGE

CROSS-REFERENCE TO RELATED
APPLICATION

Pursuant to 35 U.S.C. 119(a), this application claims the benefit of earlier filing date and right of priority to Korean Patent Application No. 10-2010-0068893, filed Jul. 16, 2010, the contents of which are hereby incorporated by reference herein in its entirety.

FIELD OF THE DISCLOSURE

An aspect of the disclosure relates to an apparatus for protecting an analog input module, and more specifically, to an apparatus for protecting an analog input module used in a programmable logic controller (PLC) system against overvoltage.

DISCUSSION OF THE RELATED ART

In general, a programmable logic controller (PLC) has an analog input module for inputting an analog signal from external devices. The analog input module converts an analog signal inputted from the external devices into a digital signal and insulates the converted digital signal. Then, the analog input module inputs the insulated digital signal to a control unit such as a micro processor unit (MPU) in the PLC.

When the analog input module converts an analog signal received from the external devices into a digital signal and then transmits the converted digital signal to the control unit, overvoltage may be inputted to the analog input module, in which the voltage level of the analog signal inputted from the external devices is higher than the level of the operating voltage applied to the analog input module. If the overvoltage is inputted to the analog input module, the analog input module is damaged by the overvoltage.

SUMMARY OF THE DISCLOSURE

Embodiments of the disclosure provide an apparatus for preventing an analog input module from being damaged even when an analog signal of overvoltage whose level is higher than that of operating voltage applied to the analog input module is inputted to the analog input module.

According to an aspect of the disclosure, there is provided an apparatus for protecting an analog input module, the apparatus including: an analog input module configured to convert one of a plurality of positive/negative analog signals inputted from the outside thereof into a digital signal and insulate the converted digital signal; and a stabilization unit configured to supply voltages of the positive/negative analog signals to the analog input module when the voltage levels of the plurality of positive/negative analog signals are higher than the levels of positive/negative operating voltages in the analog input module.

As described above, in the apparatus for protecting the analog input module according to the present invention, when the voltage level of an analog signal inputted from the outside of the input module is higher than the level of an operating voltage supplied to the analog input circuit and the insulation unit, the voltage of the analog signal inputted from the outside is supplied as an operating voltage to the power terminals of the analog input circuits and the insulation unit.

Thus, although the voltage level of the analog signal inputted to the outside is an overvoltage that is higher than the level of the operating voltage supplied to the analog input circuit and the insulation unit, the level of the operating voltage supplied to the analog input circuit and the insulation unit is increased according to the voltage level of the analog signal, so that the analog input circuit and the insulation unit are not damaged by the overvoltage of the analog signal inputted from the outside.

BRIEF DESCRIPTION OF THE DRAWINGS

These and/or other aspects and advantages of the disclosure will become apparent and more readily appreciated from the following description of the embodiments, taken in conjunction with the accompanying drawings of which.

Figure 1:
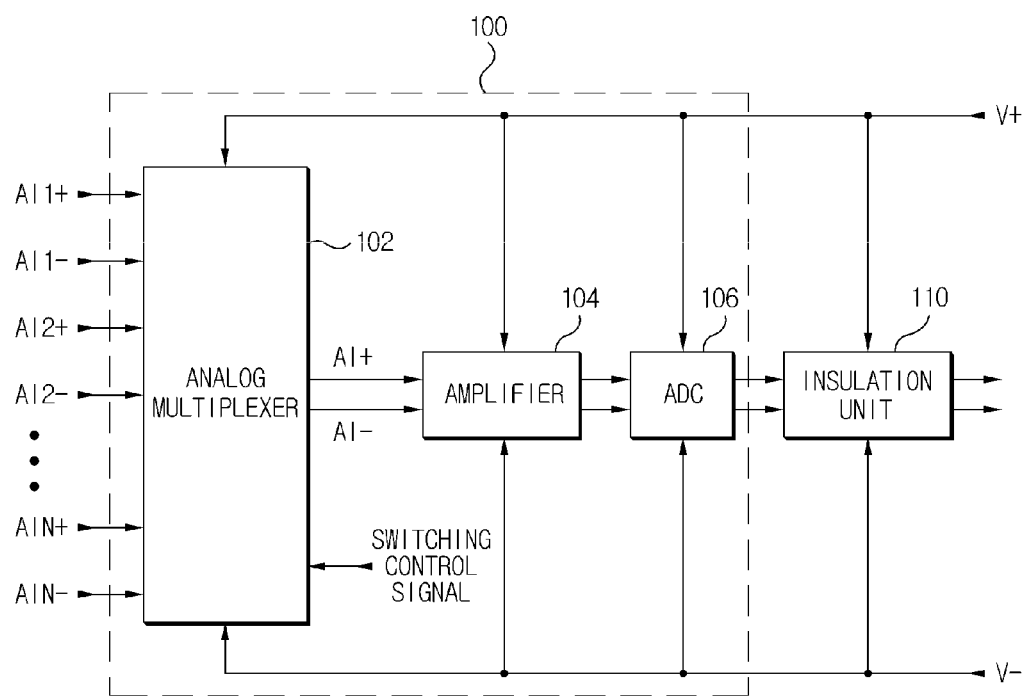
FIG. 1 is a block diagram illustrating a configuration of a general analog input module.

DETAILED DESCRIPTION OF PREFERRED
EMBODIMENTS

The disclosure is described more fully hereinafter with reference to the accompanying drawings, in which embodiments of the disclosure are shown. This disclosure may, however, be embodied in many different forms and should not be construed as limited to the embodiments set forth herein. Rather, these embodiments are provided so that this disclosure is thorough, and will fully convey the scope of the disclosure to those skilled in the art.

It will be understood that, although the terms "first", "second", etc. may be used herein to describe various elements, these components, should not be limited by these terms. These terms are only used to distinguish one element from another element. Thus, a "first" element discussed below could also be termed a "second" element without departing from the teachings of the disclosure. The sequence of operations (or steps) is not limited to the order presented in the claims or figures unless specifically indicated otherwise.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the drawings, the size and relative sizes of layers and regions may be exaggerated for clarity. The drawings are not to scale. Like reference numerals refer to like elements throughout.

FIG. 1 is a block diagram illustrating a configuration of a general analog input module.

Here, reference numeral 100 denotes an analog input circuit provided to the analog input module. The analog input circuit 100 selects one of a plurality of analog signals (AI1+, AI1−), (AI2+, AI2−), . . . , (AIN+, AIN−) inputted from the outside thereof according to a switching control signal, and converts the selected analog signals into digital signals. The analog input circuit 100 includes an analog multiplexer 102, an amplifier 104 and an analog to digital converter (ADC) 106.

The analog multiplexer 102 selects one of the plurality of analog signals (AI1+, AI1−), (AI2+, AI2−), . . . , (AIN+, AIN−) inputted from the outside thereof according to the switching control signal.

The amplifier 104 amplifies one analog signal (AI+, AI−) selected by the analog multiplexer 102.

The ADC 106 converts the one analog signal (AI+, AI−) amplified by the amplifier 104 into a digital signal.

Reference numeral 110 denotes an insulation unit. The insulation unit 110 is a photo-coupler, for example. The insulation unit 110 insulates the digital signal converted by the ADC 106 and transmits the insulated digital signal to a control unit such as a micro processing unit (MPU) for controlling the operation of a programmable logic controller (PLC).

In the analog input module configured as described above, an operating voltage (V+, V−) is inputted from an external operating voltage supply unit (not shown), and the inputted operating voltage (V+, V−) is applied to the analog multiplexer 102, the amplifier 104 and the ADC 106 in the analog input circuit 100 and the insulation unit 110, so that the operation of the analog input module is started.

In this state, the analog multiplexer 102 selects one of a plurality of analog signals (AI1+, AI1−), (AI2+, AI2−), . . . , (AIN+, AIN−) inputted from the outside thereof according to a switching control signal.

For example, the switching control signal is inputted from the control unit for controlling the operation of the PLC. The analog multiplexer 102 selects one of the plurality of analog signals (AI1+, AI1−), (AI2+, AI2−), . . . , (AIN+, AIN−) according to the switching control signal, and outputs the selected analog signal (AI+, AI−) to the amplifier 104.

Then, the amplifier 104 amplifies the analog signal (AI+, AI−) selected by the analog multiplexer 102, and the analog signal (AI+, AI−) amplified by the amplifier 104 is converted into a digital signal by the ADC 106.

The digital signal converted by the ADC 106 is insulated by the insulation unit 110, and the insulated digital signal is outputted to the control unit of the PLC.

Here, the insulation unit 110 is configured as a photo-coupler, for example. The digital signal outputted from the ADC 106 is insulated by the photo-coupler, and the insulated digital signal is transmitted to the control unit of the PLC.

In the analog input module, the analog multiplexer 102, the amplifier 104 and the ADC 106 in the analog input circuit 100 and the insulation unit 110 are damaged by overvoltage when the voltage levels of the plurality of analog signal (AI1+, AI1−), (AI2+, AI2−), . . . , (AIN+, AIN−) inputted from the outside are higher than that of the operating voltage (V+, V−) applied to the analog multiplexer 102, the amplifier 104 and the ADC 106 in the analog input circuit 100 and the insulation unit 110.

Therefore, it is required to protect the analog multiplexer 102, the amplifier 104 and the ADC 106 in the analog input circuit 100 and the insulation unit 110 from being damaged by the overvoltage even when the voltage levels of the plurality of analog signal (AI1+, AI2−), (AI2+, AI2−), . . . , (AIN+, AIN−) inputted from the outside are higher than that of the operating voltage (V+, V−) applied to the analog multiplexer 102, the amplifier 104 and the ADC 106 in the analog input circuit 100 and the insulation unit 110.

Figure 2:
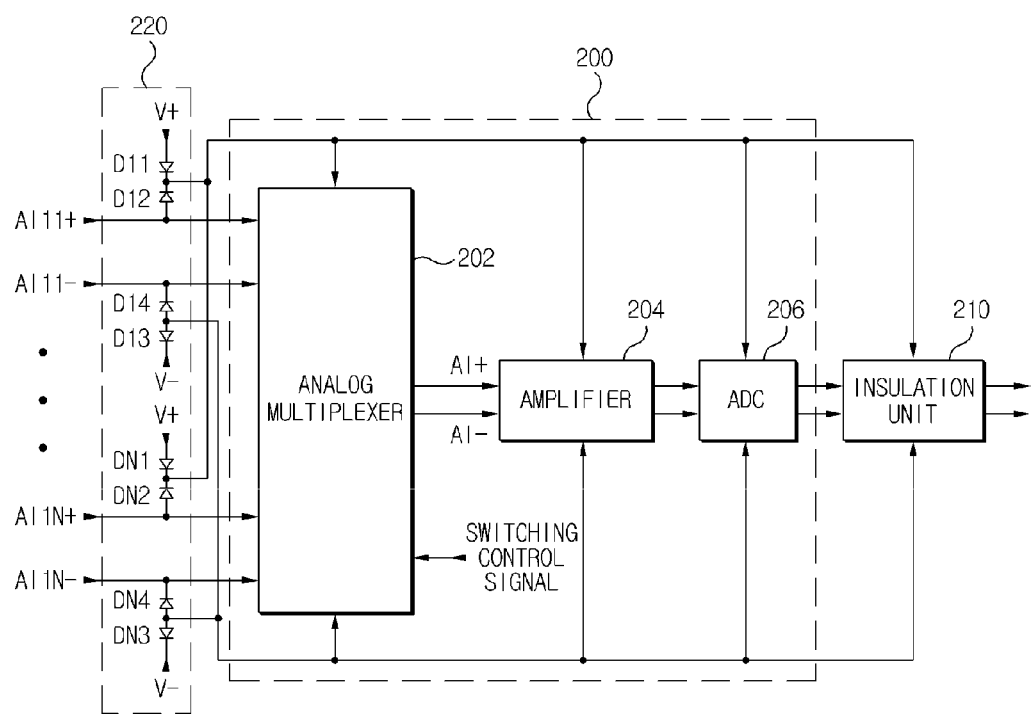
FIG. 2 is a block diagram illustrating a configuration of an analog input module according to an embodiment of the disclosure.

FIG. 2 is a block diagram illustrating a configuration of an analog input module according to an embodiment of the disclosure.

Here, reference numeral 200 denotes an analog input circuit. The analog input circuit 200 selects one of a plurality of analog signal (AI11+, AI11−), (AI12+, AI12−), . . . , (AI1N+, AI1N−) according to a switching control signal, and converts the selected analog signal into a digital signal. The analog input circuit 200 includes an analog multiplexer 202, an amplifier 204 and an ADC 206.

The analog multiplexer 202 selects one of a plurality of analog signal (AI11+, AI11−), (AI12+, AI12−), . . . , (AI1N+, AI1N−) inputted from the outside according to a switching control signal.

The amplifier 204 amplifies the analog signal selected by the analog multiplexer 204.

The ADC 206 converts the analog signal amplified by the amplifier 204 into a digital signal.

Reference numeral 210 denotes an insulation unit. The insulation unit 210 is a photo-coupler, for example. The insulation unit 210 insulates the digital signal converted by the ADC 206, and transmits the insulated digital signal to a control unit such as an MPU for controlling the operation of a PLC.

Reference numeral 220 denotes a stabilization unit. The stabilization unit 220 allows positive and negative operation voltages V+ and V− inputted from an external operating voltage supply unit (not shown) to be respectively supplied to positive and negative power terminals of the analog multiplexer 202, the amplifier 204 and the ADC 206 in the analog input circuit 200 and the insulation unit 210. The stabilization unit 220 also allows the operation voltage applied to the positive and negative power terminals of the analog multiplexer 202, the amplifier 204 and the ADC 206 in the analog input circuit 200 and the insulation unit 210 to be varied according to the voltage levels of the plurality of analog signal (AI11+, AI11−), (AI12+, AI12−), . . . , (AI1N+, AI1N−) inputted from the outside.

The stabilization unit 220 includes a plurality of diodes D11, D21, . . . , DN1 and D13, D23, . . . , DN3 for respectively applying positive and negative operating voltages V+ and V− inputted from the external operating voltage supply unit (not shown) to the positive and negative power terminals of the analog multiplexer 202, the amplifier 204 and the ADC 206 in the analog input circuit 200 and the insulation unit 210, and a plurality of diodes D12, D22, . . . , DN2 and D14, D24, . . . DN4 for respectively applying positive analog signals AI11+, AI12+, . . . , AI1N+ and negative analog signals AI11−, AI12−, . . . , AI1N− to the positive and negative terminals of the analog multiplexer 202, the amplifier 204 and the ADC 206 in the analog input circuit 200 and the insulation unit 210.

In the apparatus according to the embodiment of the disclosure, configured as described above, the positive operating voltage V+ inputted from the external operating voltage supply unit is applied to the positive power terminals of the analog multiplexer 202, the amplifier 204 and the ADC 206 in the analog input circuit 200 and the insulation unit 210 through the plurality of diodes D11, D21, . . . , DN1.

The negative operating voltage V− inputted from the external operating voltage supply unit is applied to the negative power terminals of the analog multiplexer 202, the amplifier 204 and the ADC 206 in the analog input circuit 200 and the insulation unit 210 through the plurality of diodes D13, D23, . . . , DN3.

Thus, the operating voltage (V+, V−) is applied to the analog multiplexer 202, the amplifier 204 and the ADC 206 in the analog input circuit 200 and the insulation unit 210, so that the analog input module normally operates.

The positive operating voltage V+ that passes through the plurality of diodes D11, D21, ..., DN1 is cut off by the diodes D12, D22, ..., DN2. Therefore, the positive operating voltage has no influence on inputs of the plurality of positive analog signals AI11+, AI12+, ..., AI1N+.

Further, the negative operating voltage V− that pass through the plurality of diodes D13, D23, ..., DN3 is cut off by the diodes D14, D24, ..., DN4. Therefore, the negative operating voltage no influence on inputs of the plurality of negative analog signals AI11−, AI12−, ..., AI1N.

In this state, the analog multiplexer 202 selects one of the plurality of analog signals (AI11+, AI11−), (AI12+, AI12−), ..., (AI1N+, AI1N−) inputted from the outside according to a switching control signal.

That is, the switching control signal is inputted from a control unit (not shown) for controlling the operation of the PLC. The analog multiplexer 202 selects one of the plurality of analog signals (AI11+, AI11−), (AI12+, AI12−), ..., (AI1N+, AI1N−) according to the switching control signal, and outputs the selected analog signal to the amplifier 204.

Then, the amplifier 204 amplifies the analog signal selected by the analog multiplexer 202, and the analog signal amplified by the amplifier 204 is converted into a digital signal by the ADC 206.

The digital signal converted by the ADC 206 is insulated by the insulation unit 210, and the insulated digital signal is outputted to the controller (not shown).

Here, the insulation unit 210 is configured as a photo-coupler, for example. The digital signal outputted from the ADC 206 is insulated by the photo-coupler, and the insulated digital signal is transmitted to the control unit (not shown) of the PLC.

Although it has been illustrated in this embodiment that the positive and negative operating voltage V+ and V− supplied from the operating voltage supply unit (not shown) are respectively applied to the positive and negative power terminals of the analog multiplexer 202, the amplifier 204 and the ADC 206 in the analog input circuit 200 and the insulation unit 210 through each of the plurality of diodes D11, D21, ..., DN1 and D13, D23, ..., DN3, the positive and negative operating voltage V+ and V− supplied from the operating voltage supply unit (not shown) may be applied to the positive and negative power terminals of the analog multiplexer 202, the amplifier 204 and the ADC 206 in the analog input circuit 200 and the insulation unit 210 through diodes, respectively.

In the operation described above, when the voltage levels of the plurality of positive analog signals AI11+, AI12+, ..., AI1N+ are higher than that of the positive operating voltage inputted from the external operating voltage supply unit (not shown), the voltages of the corresponding positive analog signals AI11+, AI12+, ..., AI1N+ are applied to the positive power terminals of the analog multiplexer 202, the amplifier 204 and the ADC 206 in the analog input circuit 200 and the insulation unit 210 through the corresponding diodes D12, D22, ..., DN2. Therefore, the operating voltage applied to the analog multiplexer 202, the amplifier 204 and the ADC 206 in the analog input circuit 200 and the insulation unit 210 is increased to the voltage levels of the corresponding positive analog signals AI11+, AI12−, ..., AI1N+, and the increased operating voltage is applied to the analog multiplexer 202, the amplifier 204 and the ADC 206 in the analog input circuit 200 and the insulation unit 210. Thus, the analog multiplexer 202, the amplifier 204 and the ADC 206 in the analog input circuit 200 and the insulation unit 210 are not damaged by the positive overvoltage of the inputted positive analog signals AI11+, AI12+, ..., AI1N+.

When the voltage levels of the plurality of negative analog signals AI11−, AI12−, ..., AI1N− are lower than that of the negative operating voltage V− inputted from the external operating voltage supply unit (not shown), the voltages of the negative analog signals AI11−, AI12−, ..., AI1N− are applied to the negative power terminals of the analog multiplexer 202, the amplifier 204 and the ADC 206 in the analog input circuit 200 and the insulation unit 210 through the corresponding diodes D13, D23, ..., DN3. Therefore, the operating voltage applied to the analog multiplexer 202, the amplifier 204 and the ADC 206 in the analog input circuit 200 and the insulation unit 210 is decreased to the voltage level of the corresponding negative analog signals AI11−, AI12−, ..., AI1N−. Thus, the analog multiplexer 202, the amplifier 204 and the ADC 206 in the analog input circuit 200 and the insulation unit 210 are not damaged by of the negative overvoltage of the inputted negative analog signals AI11−, AI12−, ..., AI1N−.

For example, when the voltage level of the analog signal AI11+ is higher than that of the positive operating voltage V+ inputted from the external operating voltage supply unit (not show) and the voltage level of the analog signal AI11− is lower than that of the negative operating voltage V− inputted from the external operating voltage supply unit (not show), the voltages of the analog signals (AI11+, AI11−) are respectively applied to the positive and negative power terminals of the analog multiplexer 202, the amplifier 204 and the ADC 206 in the analog input circuit 200 and the insulation unit 210 through the diodes D12 and D14.

Therefore, the operating voltage applied to the analog multiplexer 202, the amplifier 204 and the ADC 206 in the analog input circuit 200 and the insulation unit 210 is controlled according to the voltage levels of the inputted analog signals (AI11+, AI11−). Thus, the analog multiplexer 202, the amplifier 204 and the ADC 206 in the analog input circuit 200 and the insulation unit 210 are not damaged while stably processing the analog signals (AI11+, AI11−) in an overvoltage state.

Although the present invention has been described in connection with the preferred embodiments, the embodiments of the present invention are only for illustrative purposes and should not be construed as limiting the scope of the present invention. It will be understood by those skilled in the art that various changes and modifications can be made thereto within the technical spirit and scope defined by the appended claims.

What is claimed is:

1. An apparatus for protecting an analog input module, the apparatus comprising:

an analog input module configured to convert one of a plurality of positive/negative analog signals inputted from the outside thereof into a digital signal and insulate the converted digital signal; and a stabilization unit configured to supply voltages of the positive/negative analog signals to the analog input module when the voltage levels of the plurality of positive/negative analog signals are higher than the levels of positive/negative operating voltages in the analog input module, wherein the stabilization unit comprises:

a plurality of first diodes configured to respectively supply the positive operating voltage to a positive power terminal of the analog input module;

a plurality of second diodes configured to respectively supply the plurality of positive analog signals to the positive power terminal of the analog input module;

a plurality of third diodes configured to respectively supply the negative operating voltage to a negative power terminal of the analog input module; and a plurality of fourth diodes configured to respectively supply the plurality of negative analog signals to the negative power terminal of the analog input module.

2. The apparatus of claim 1, wherein the positive/negative operating voltages are inputted in response to the plurality of positive/negative analog signals, respectively.

3. The apparatus of claim 1, wherein the analog input module comprises:

an analog input circuit configured to convert one of a plurality of positive/negative analog signals inputted from the outside thereof into a digital signal; and an insulation unit configured to insulate the digital signal converted by the analog input circuit.

4. The apparatus of claim 3, wherein the analog input circuit comprises:

a multiplexer configured to select one of the plurality of inputted positive/negative analog signals; and an analog to digital converter (ADC) configured to convert the positive/negative analog signal selected by the multiplexer into a digital signal.

5. The apparatus of claim 4, wherein the analog input circuit further comprises an amplifier configured to amplify the positive/negative analog signal selected by the multiplexer.

6. The apparatus of claim 3, wherein the insulation unit is a photo-coupler.

* * * * *